US008554763B2

(12) United States Patent
Jeon (10) Patent No.: US 8,554,763 B2
(45) Date of Patent: Oct. 8, 2013

(54) APPARATUS AND METHOD FOR SELECTING AND PERFORMING AT LEAST ONE DATA FUNCTION

(75) Inventor: Soo Jin Jeon, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 851 days.

(21) Appl. No.: 12/018,981

(22) Filed: Jan. 24, 2008

(65) Prior Publication Data

US 2008/0208842 A1 Aug. 28, 2008

(30) Foreign Application Priority Data

Feb. 22, 2007 (KR) ........................ 10-2007-0017851

(51) Int. Cl.
*G06F 17/30* (2006.01)

(52) U.S. Cl.
USPC ..... 707/722; 707/705; 707/736; 707/E17.014

(58) Field of Classification Search
USPC .............. 707/5, 999.005, E17.014, 722, 705, 707/736
See application file for complete search history.

(56) References Cited

U.S. PATENT DOCUMENTS

| 6,222,921 | B1 * | 4/2001 | Mugura et al. ................. 379/354 |
| 6,385,469 | B1 * | 5/2002 | Alperovich et al. ........... 455/574 |
| 6,727,916 | B1 * | 4/2004 | Ballard .......................... 715/758 |
| 7,051,080 | B1 * | 5/2006 | Paul et al. ...................... 709/217 |
| 7,467,131 | B1 * | 12/2008 | Gharachorloo et al. .............. 1/1 |
| 2002/0116528 | A1 * | 8/2002 | Vale ............................... 709/245 |
| 2003/0118182 | A1 * | 6/2003 | Elomaa et al. ................. 380/203 |
| 2003/0120741 | A1 * | 6/2003 | Wu et al. ........................ 709/213 |
| 2004/0119755 | A1 | 6/2004 | Guibourge |
| 2004/0249799 | A1 * | 12/2004 | Demarcken et al. .............. 707/3 |
| 2005/0122429 | A1 | 6/2005 | Katsube et al. |
| 2005/0131909 | A1 * | 6/2005 | Cavagnaro et al. ............. 707/10 |
| 2006/0253874 | A1 | 11/2006 | Stark et al. |
| 2007/0027848 | A1 | 2/2007 | Howard et al. |
| 2007/0192289 | A1 * | 8/2007 | Lin et al. ............................ 707/3 |
| 2007/0239676 | A1 * | 10/2007 | Stonehocker et al. ............ 707/3 |

FOREIGN PATENT DOCUMENTS

| EP | 1603312 | | 12/2005 |
| GB | 2278756 | A * | 12/1994 |
| KR | 10-2001-0066456 | | 7/2001 |
| KR | 10-2005-0060495 | | 6/2005 |
| KR | 2006070054 | A * | 6/2006 |

OTHER PUBLICATIONS

Author: Derwent—Lee H J Title: Mobile terminal for directly accessing wireless internet site by key input operation and operation method thereof, automatically activates wireless internet browser if user presses number key and defined key Date: Jan. 1, 2006 Derwent-ACC-No. 2007-228019.*

Karlson, et al., "FaThumb: A Facet-based Interface for Mobile Search", Chi Conference Proceedings, Human Factors in Compouting Machinery (ACM) Press, pp. 711-720, vol. 2, Apr. 2006.

* cited by examiner

*Primary Examiner* — Fred I Ehichioya
*Assistant Examiner* — Shiow-Jy Fan
(74) *Attorney, Agent, or Firm* — Lee, Hong, Degerman, Kang & Waimey (57) ABSTRACT

A method for displaying data items in a mobile terminal includes receiving a user search request, automatically identifying data items which individually comprise the search request, and displaying a distinct number in association with each of the identified data items, wherein each of the identified data items are individually selectable responsive to a corresponding number input by a user.

10 Claims, 13 Drawing Sheets

APPARATUS AND METHOD FOR SELECTING AND PERFORMING AT LEAST ONE DATA FUNCTION

CROSS-REFERENCE TO RELATED APPLICATIONS

Pursuant to 35 U.S.C. §119(a), this application claims the priority benefit of Korean Patent Application No. 10-2007-0017851, filed on Feb. 22, 2007, which is hereby incorporated by reference as if fully set forth herein.

BACKGROUND OF THE INVENTION

1. Field of the Invention

The present invention relates to a mobile terminal, and more particularly, to a method for selecting a data item and performing at least one function associated with the selected data item.

2. Discussion of the Related Art

A mobile terminal according to the related art searches for at least one phone number as follows.

First, the mobile terminal enters a phone number search mode based on a user's selection and receives input from the user for searching for the phone number. The mobile terminal then searches for at least one phone number corresponding to the received user input and displays at least one phone number in a list, if any phone number corresponds to the received user input. For example, if the input information is 'Kim', the mobile terminal searches for and displays at least one phone number having 'Kim' in a name assigned to a pre-stored phone number.

The user then selects a phone number from the displayed phone numbers using a direction key. For example, the user may select a phone number displayed on the fourth line, from the top, of a phone number list by scrolling through the displayed phone number(s) in sequence from the first line of the phone number list.

However, according to the related art, the user has to operate the direction key whenever the user wants to select a phone number. Thus, the amount of time spent navigating through the phone number list may increase due to manual operation of a direction key.

Additionally, the time spent navigating is not exclusive to a list of phone numbers. A user must operate a direction key or input an address if the user wants to access an audio file, a video file, a broadcast channel, or a web-site.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a method for displaying data items in a mobile terminal is provided. The method includes receiving a user search request, automatically identifying data items which individually comprise the search request, and displaying a distinct number in association with each of the identified data items, wherein each of the identified data items are individually selectable responsive to a corresponding number input by a user.

In one feature the method for displaying data items in a mobile terminal further includes receiving a selection request including a number corresponding to a particular one of the identified data items, and automatically selecting the particular one of the identified data items if a key associated with the selection request is contacted by the user for a predetermined period of time.

In yet another feature the method for displaying data items in a mobile terminal further includes receiving a selection request including a number corresponding to a particular one of the identified data items, highlighting the particular one of the identified data items responsive to the selection request, and selecting the particular one of the identified data items responsive to further user input. The method further includes receiving a further user input at the mobile terminal, identifying that a number included in the further user input is a further search request based upon a period of time that a key associated with the further user input is contacted by the user In still yet another feature the method for displaying data items in a mobile terminal further includes automatically displaying an option menu associated with a particular one of the identified data items responsive to user selection of the particular one of the identified data items. The method further includes receiving a selection request including a plurality of distinct numbers individually corresponding to one or more of the identified data items, and selecting the one or more of the identified data items responsive to the selection request.

In one embodiment a mobile terminal adapted to display data items includes a display unit for displaying at least one data item and a distinct number associated with each of the at least one data item, an input unit for inputting data for a search request, and selecting the distinct number associated with one of the at least one data item, a storage unit for storing the at least one data item, and a control unit for finding the at least one data item corresponding to the search request, controlling the display unit to display a data list comprising the at least one data item found and the distinct number associated with each of the at least one data item, and performing at least one function related to a selected one of the at least one data item. The mobile terminal further includes a wireless communication module for receiving and transmitting a radio signal to and from another terminal, and a broadcast module for receiving a broadcast program through a broadcast channel.

These and other embodiments will also become readily apparent to those skilled in the art from the following detailed description of the embodiments having reference to the attached figures, the invention not being limited to any particular embodiment disclosed

BRIEF DESCRIPTION OF THE DRAWINGS

The accompanying drawings, which are included to provide a further understanding of the invention and are incorporated in and constitute a part of this application, illustrate embodiments of the invention and serve to explain the principle of the invention together with the description. In the drawings.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
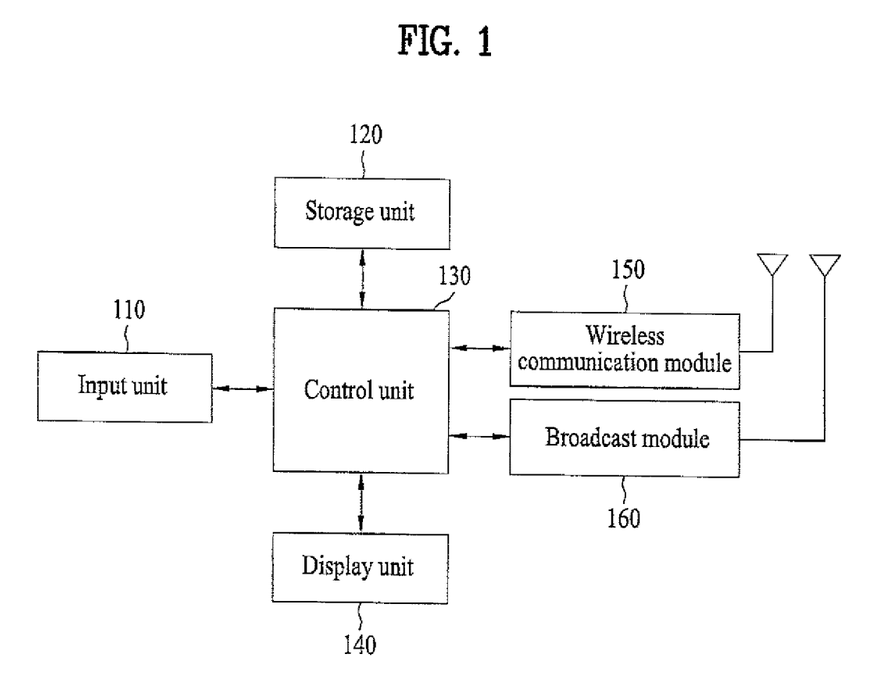
FIG. 1 is a block diagram illustrating a mobile terminal for performing functions related to data according to the present invention.
Figure 2:
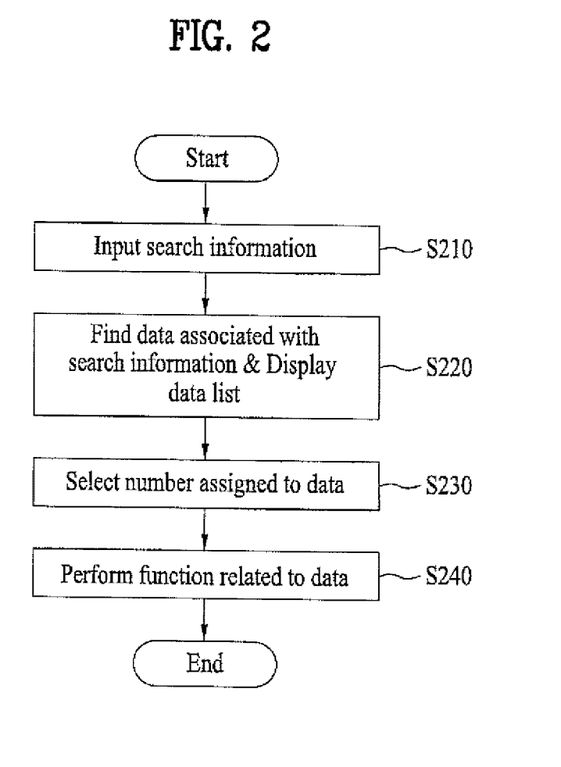
FIG. 2 is a flowchart illustrating a general process of performing a data procedure according to the present invention.

FIG. 1 is a block diagram illustrating a mobile terminal for performing functions associated with a data item according to the present invention. FIG. 2 is a flowchart illustrating a general process of performing functions associated with a data item according to the present invention.

Referring to FIG. 1, the mobile terminal 100 includes an input unit 110, a storage unit 120, a control unit 130, a display unit 140, a wireless communication module 150, and a broadcast module 160. The mobile terminal 100 may include additional components, such as a microphone, speaker, and transceiver. All the components of the mobile terminal 100 are operatively coupled and configured. Specific examples of the mobile terminal 100 may include, but are not limited to, cell phones, PDAs, smart phones, and laptops.

The input unit 110 generates a signal corresponding to an input received from a user of the mobile terminal 100. For example, the input unit 110 may include a key pad, a touch screen, or a touch pad. Additionally, the user may input search information to the mobile terminal 100 through input unit 110.

The storage unit 120 stores the input/output (I/O) data and operating programs of the mobile terminal 100. Additionally, the storage unit 120 may store a phone number, an audio file, a video file, a text file, a broadcast channel, or an address of a web-site (hereinafter, referred to as a 'web-address').

The data stored in the storage unit 120 is searchable. The data stored in the storage unit 120 may be assigned a name, which may include a letter, a number, an icon, a symbol, a word, or a character.

A phone number may include at least one of a phone number stored in the storage unit 120 by the user, a phone number selected from the phone numbers in the storage unit 120, and a phone number automatically stored in the storage unit 120 after the reception or transmission of that phone number. A web-address may include at least one of a web-address previously visited by the mobile terminal 100, a web-address selected by a user, or a default web-address set for the mobile terminal 100.

The control unit 130 controls all the functions and operations of the mobile terminal 100. Particularly, the control unit 130 finds data to which a name is assigned from the storage unit 120. For example, if a letter 'S' is entered as the search information, data having a name containing the letter 'S' is displayed (e.g., Samuel, Johnson, Larson, and Smith). The search information may be a letter, a series of letters, a word, a number, a character, a symbol, or an icon. The control unit 130 also performs at least one function associated with specific data to which a selected number is assigned, when the user selects the number from the list of found data.

The display unit 140 displays information related to the mobile terminal 100. Additionally, the display unit 140 displays data which was found in a search. For example, the display unit 140 displays the name and number assigned to the data in a data list.

The wireless communication module 150 receives and transmits a radio signal to and from an outside mobile terminal or server through a wireless communication network. For example, the mobile terminal 100 may connect to a web site through the wireless communication module 150. The mobile terminal 100 may also connect to a web-site through a wired communication module (not shown).

The broadcast module 160 receives a broadcast program through a broadcast channel.

Referring to FIG. 2, the user inputs search information to the mobile terminal 100 through the input unit 110 (S210). In this example, the display unit 140 displays an input window for displaying the input search information on a screen.

For example, the search information may include at least one of a letter, a number, a word, an icon, a character, and a symbol, for finding specific data from various data stored in the storage unit 120.

The control unit 130 finds at least one data item associated with the input search information (S220). The found data item may be displayed by the display unit 140 in a data list.

The control unit 130 assembles the data list of at least one found data item and controls the display unit 140 to display the data list. The data may be at least one of a phone number, an audio file, a video file, a text file, a broadcast channel, and a web-address.

Once the data list is displayed, the user may select a number assigned to specific data from the displayed data list using the input unit 110 (S230). For example, if the search found four specific data associated with the search information, each of the four specific data is assigned a number.

Assume that the input search information is 'da' and the search returned four results: 'day', 'Dan', 'sedan', and 'Great Dane'. Each of the four results is assigned a number 1, 2, 3, and 4, respectively. The displayed data list provides these assigned numbers with the corresponding specific data.

From the data list, the user may select the number which is assigned to the corresponding specific data, using a number key of a key pad or a touch screen. The number may be selected via the key pad if the input unit 110 is equipped with a key pad. Additionally, the user may select the number assigned to corresponding specific data using a number key displayed on the touch screen, if the input unit 110 is equipped with a touch screen.

Further, if the user selects the assigned number corresponding with the specific data the control unit 130 may perform at least one function related to the specific data (S240).

Referring to FIG. 3 through FIG. 12, the procedures related to performing functions related to data according to the embodiments of the present invention are explained in detail.

Figure 3:
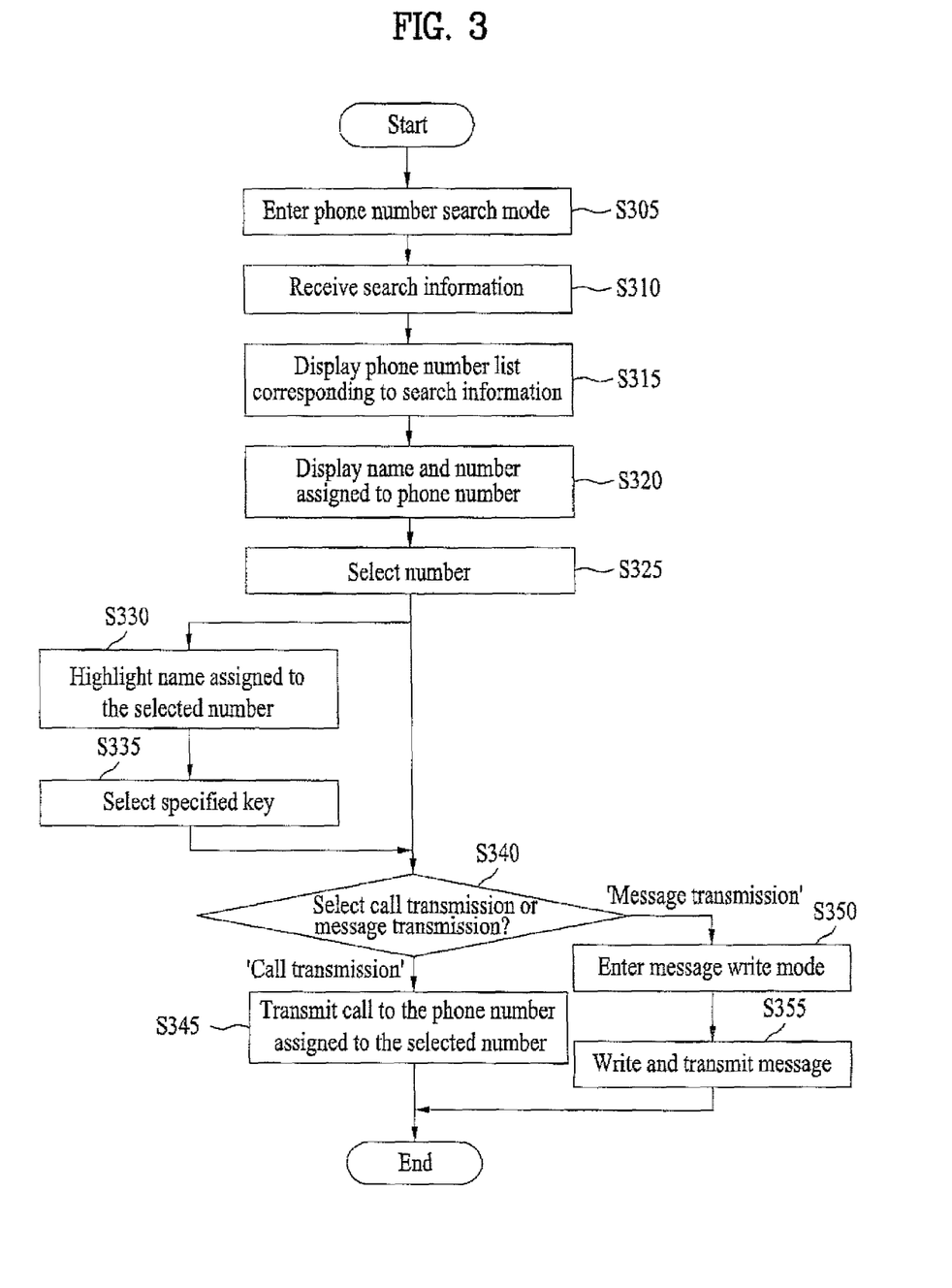
FIG. 3 is a flowchart illustrating a detailed process of performing a data procedure according to a first embodiment according to the present invention.

Referring to FIGS. 1 and 3, a data performing procedure according to the first embodiment is described. In FIG. 3, the data is restricted to a phone number. More specifically, the mobile terminal 100 enters a phone number search mode for searching for at least one phone number (S305).

In the phone number search mode, the mobile terminal 100 receives the search information from the user to find at least one phone number (S310). The search information may include letters, words, or symbols. The mobile terminal 100 displays an input window on a specified part of a screen and also displays the search information on the input window. For example, in FIG. 4, the display unit 140 displays the search information (i.e., 'K'), input by the user, on the input window displayed on the top of a screen (410).

After finding the data associated with the search information, the display unit 140 displays a phone number list comprising at least one phone number that corresponds to the search information (S315). The display unit 140 displays a name and a number assigned to each phone number when displaying the phone number list (S320).

If the control unit 130 finds at least one phone number which corresponds to the search information from the storage unit 120, it controls the display unit 140 to display the phone number list including the names which satisfy the search information and at least one phone number corresponding to each of the names. When displaying the phone number list, the control unit 130 may control the display unit 140 to display the found phone numbers in order according to the frequency of call or message reception and transmission.

From the phone number list, the user selects a phone number or a name (S325). With respect to number selection, the user may select a number using a number key of a key pad or a touch screen if the input unit 110 is equipped with the key pad or the touch screen.

The mobile terminal 100 may distinguish a number input as either search information or a number assigned to data. The mobile terminal 100 may recognize a number allocated to a number key as search information if the number key is pressed for a duration equal or longer than a reference time and as a number assigned to data if the number key is pressed for a shorter duration than the reference time. In an alternate embodiment, the mobile terminal 100 may recognize a number allocated to a number key as a number assigned to data if the number key is pressed for a duration equal or longer than the reference time and as search information if the number key is pressed for a shorter duration than the reference time.

In another embodiment, the mobile terminal 100 may recognize a number allocated to a number key as search information if the number key is pressed for a duration equal or longer than a reference time in a number input mode and as a number assigned to data if the number key is pressed for a shorter duration than the reference time in the number input mode.

At step S330, the display unit 140 highlights a name corresponding to a phone number to which the selected number is assigned so as to distinguish the name from other names on the display list. Alternatively, the display unit 140 may also display the name and the number assigned to the phone number using a specific color or a specific pattern, in addition to the highlighting.

Figure 4:
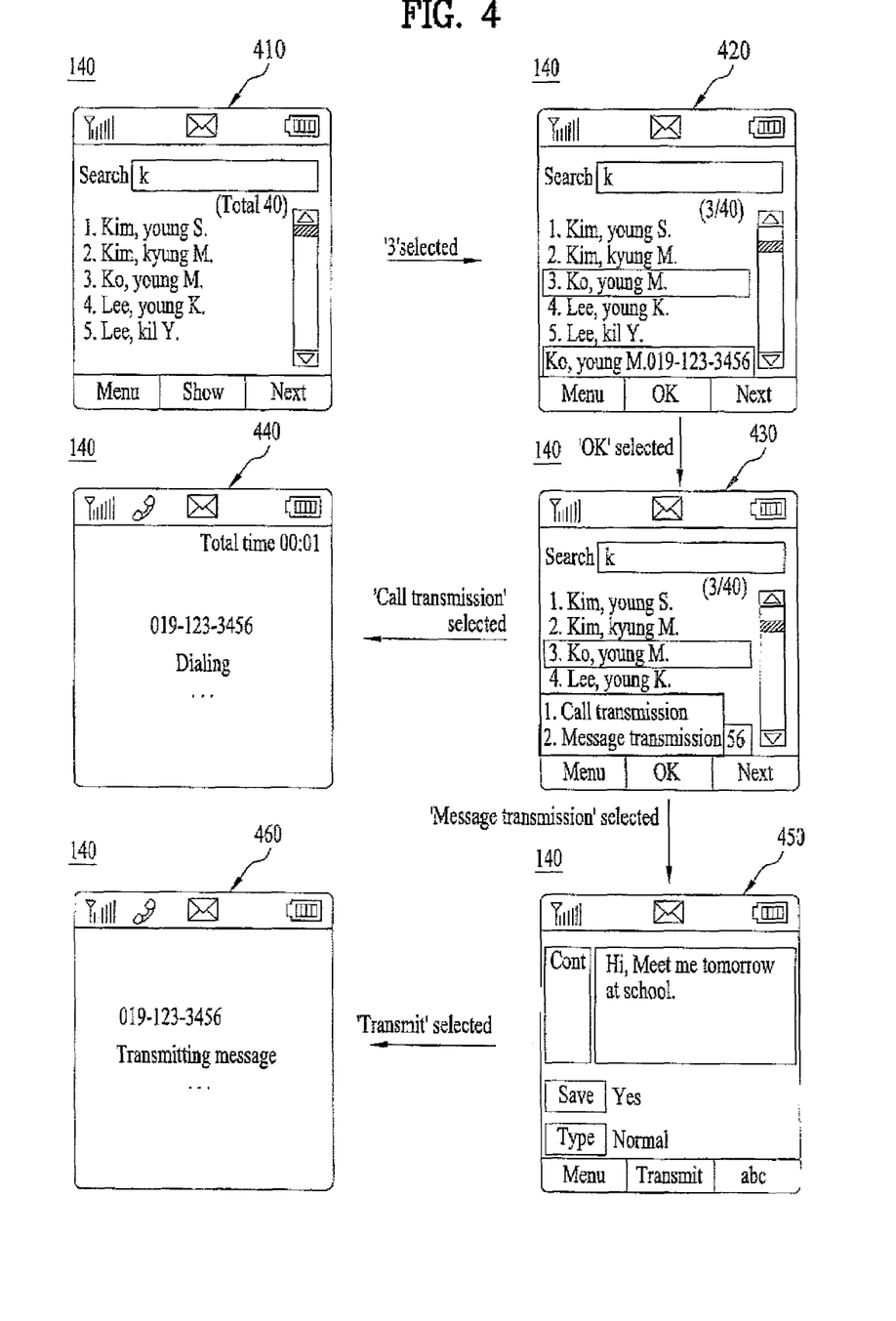
FIG. 4 illustrates various displays on a screen related to performing the data procedure shown in FIG. 3 according to the present invention.

For example, in FIG. 4, the display unit 140 may display the name to which '3' is assigned using a highlight when the user presses or touches the '3' key (420). In other words, if the display unit 140 displays five (5) names to which numbers 1-5 are assigned and one number and name is highlighted according to the user's selection.

Thereafter, the mobile terminal 100 enters a mode for performing functions related to the phone number selected using the assigned number if the user selects a specified key at step S335. That is, the user may press or touch any specified key to perform functions related to the phone number.

Furthermore, the mobile terminal 100 may execute steps S330 and S335 if a key of the assigned number is pressed or touched for a shorter duration than a reference time. The mobile terminal 100 may also enter a mode for performing functions related to the phone number if the key of the assigned number is pressed or touched for a duration equal or longer than the reference time.

In an alternate embodiment, it is possible to omit steps S330 and S335. In the alternate embodiment, the mobile terminal 100 may directly enter the mode for performing functions related to the phone number.

After the specified key is pressed, the user is given an option to choose between a call transmission and a message transmission. Accordingly, the user may select a call transmission or a message transmission through the input unit 110 (S340).

Referring to FIG. 4, the display unit 140 displays a window on a part of the screen to allow the user to select either the call transmission or the message transmission (430). If the user selects the call transmission, the mobile terminal 100 transmits a call to the phone number to which the selected number is assigned through the wireless communication module 150 (FIG. 3, S345 and FIG. 4, 440).

However, if the user selects the message transmission, the mobile terminal 100 enters a mode to allow the user to write a message to be transmitted to the phone number corresponding to the selected number (FIG. 3, S350 and FIG. 4, 450). After the message is written by the user, the mobile terminal 100 transmits the written message to the phone number through the wireless communication module 150 (FIG. 3, S355 and FIG. 4, 460).

Figure 5:
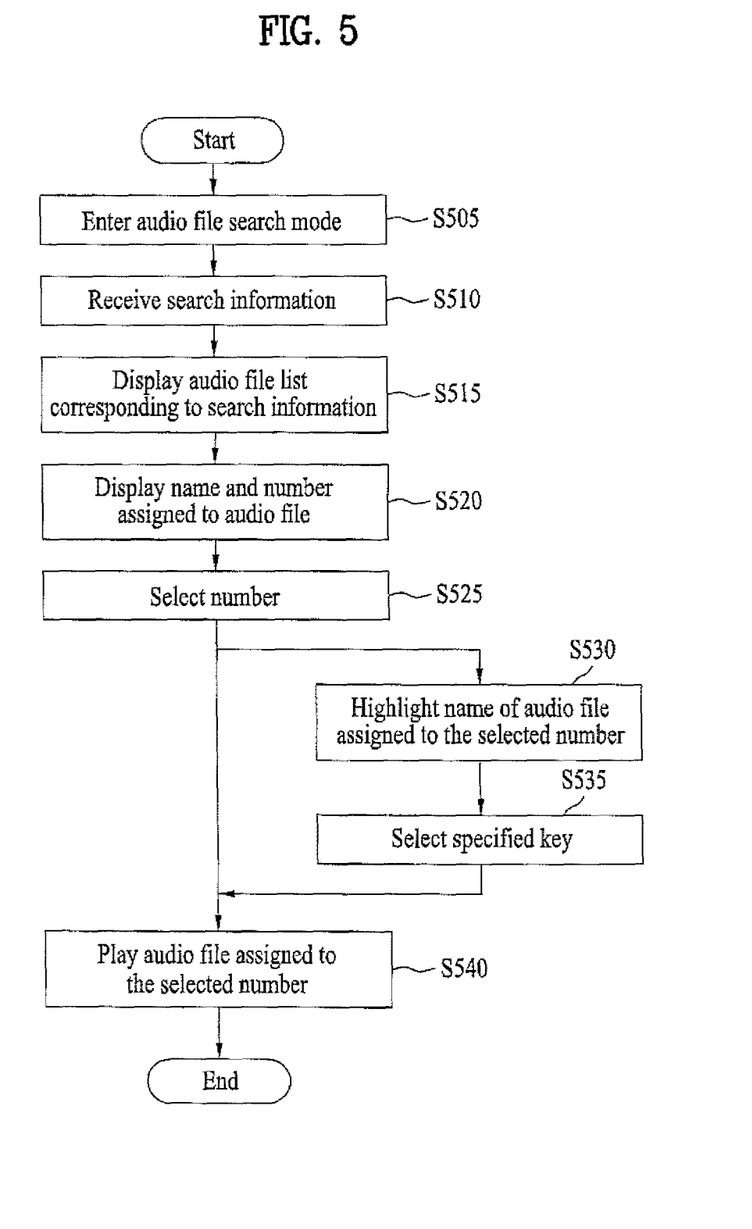
FIG. 5 is a flowchart illustrating a detailed process of performing a data procedure according to a second embodiment according to the present invention.

Referring to FIGS. 1 and 5, a data performing procedure according to the second embodiment is described. In FIG. 5, the data refers to an audio file. The mobile terminal 100 enters an audio file search mode for searching for an audio file according to the user's selection (S505). The mobile terminal 100 receives the search information from the user for finding at least one audio file (S510).

Figure 6:
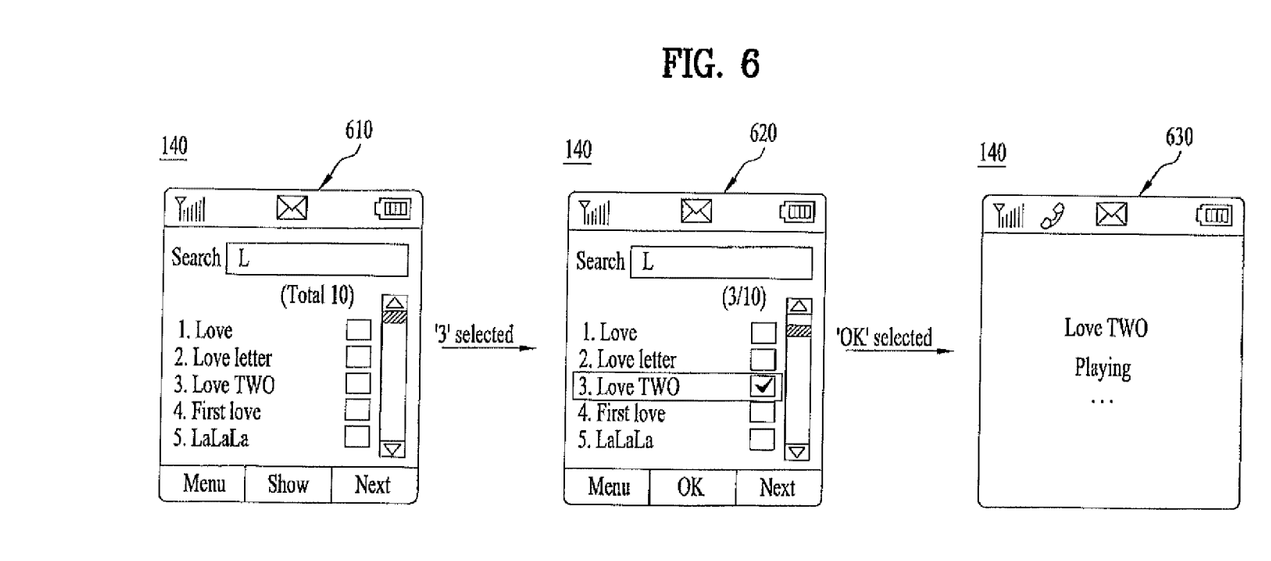
FIG. 6 illustrates various displays on a screen related to performing the data procedure shown in FIG. 5.

For example, in FIG. 6, the display unit 140 displays 'L' on an input window displayed on the top of a screen (610). 'L' is the search information input by the user The display unit 140 displays an audio file list comprising at least one audio file to which a name or a title is assigned (S515). Here, the display unit 140 displays a name of each audio file and corresponding number assigned to each audio file when displaying the audio file list (FIG. 5, S520 and FIG. 6, 610).

The control unit 130 finds at least one audio file that satisfies the search information from the storage unit 120, and controls the display unit 140 to display the audio file list including at least one audio file found from the storage unit 120. Further, the control unit 130 may control the display unit 140 to display the found audio files according to the frequency of execution when displaying the audio file list.

For example, in FIG. 6, the display unit 140 displays an audio file list including at least one audio file with a name or title including the search information 'L' (610). At least one audio file is displayed with a number assigned to each audio file.

The user selects a number from the numbers assigned to the found audio files (S525). In making the selection, the user may select two or more audio files by selecting two or more numbers from numbers assigned to the found audio files.

The display unit 140 highlights the name and number of the audio file selected by the user (S530). The display unit 140 may also display the name and the number assigned to the audio file using a specific color or a specific pattern, in addition to a highlight.

For example, in FIG. 6, the display unit 140 may highlight the name of the audio file assigned to the number '3', when the user presses or touches the '3' key (620). The display unit 140 displays five (5) names to which numbers 1-5 are assigned and one number and name is highlighted according to the user's selection. Thereafter, the mobile terminal 100 may play the audio file to which the selected number is assigned (FIG. 5, S540 and FIG. 6, 630) when the user selects a specified key (S535).

Furthermore, the mobile terminal 100 may execute steps S530 and S535 if a key of the assigned number is pressed or touched for a shorter duration than a reference time, or execute step S540 directly after step S525 if the key of the assigned number is pressed or touched for an equal or a longer duration than the reference time.

As discussed above, in an alternate embodiment, it is possible to omit steps S530 and S535. In the alternate embodiment, the mobile terminal 100 may directly enter the mode for performing functions related to the audio file.

Figure 7:
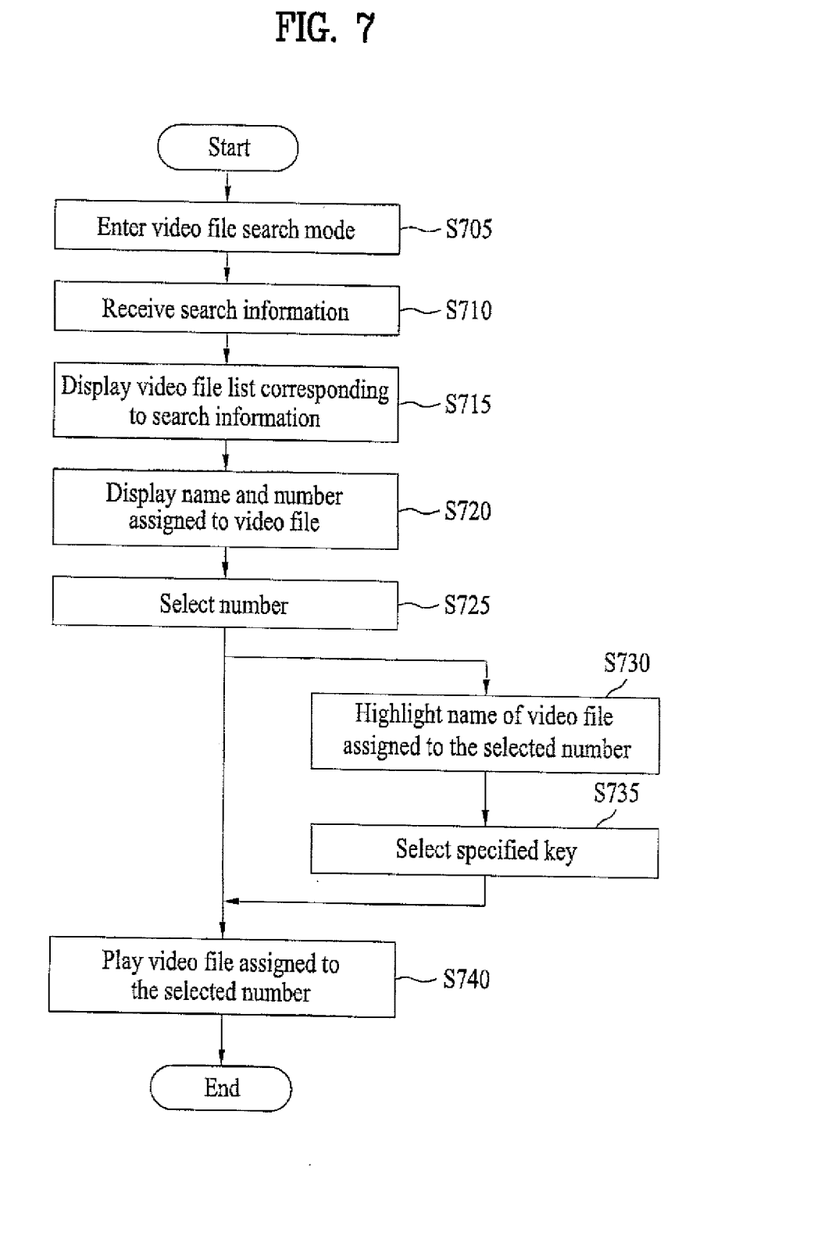
FIG. 7 is a flowchart illustrating a detailed process of performing a data procedure according to a third embodiment according to the present invention.

Referring to FIGS. 1 and 7, a data performing procedure according to the third embodiment is described. In FIG. 7, the data refers to a video file. The video file may include a still video file and a moving video file. The mobile terminal 100 enters a video file search mode for searching for a video file according to the user's selection (S705). The mobile terminal 100 receives the search information from the user for locating at least one video file (S710).

Figure 8:
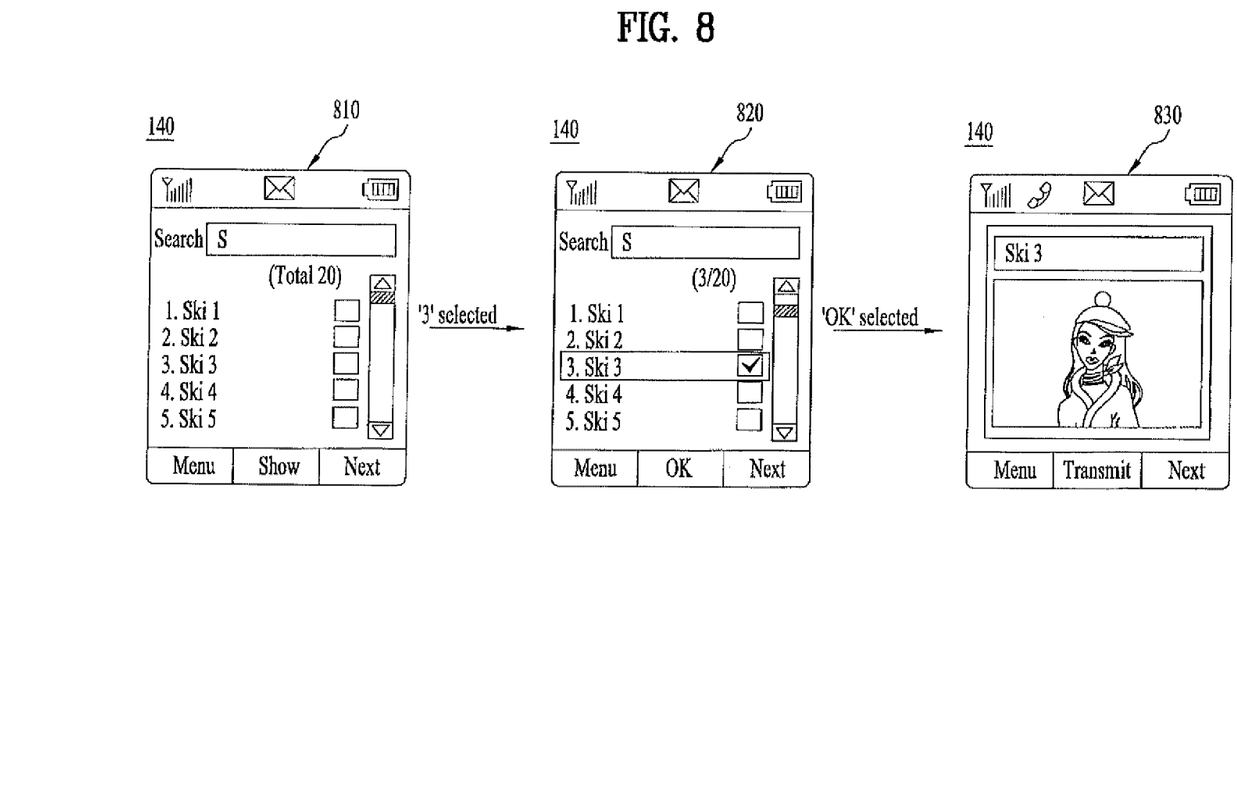
FIG. 8 illustrates various displays on a screen related to performing the data procedure shown in FIG. 7 according to the present invention.

For example, in FIG. 8, display unit 140 displays 'S' in an input window displayed on the top of a screen (810). 'S' is the letter input by the user through input unit 110.

The display unit 140 displays a video file list comprising at least one video file corresponding to the search information (S715). The display unit 140 displays a name of each of the video files and the number assigned to the each video file when displaying the video file list (S720).

The control unit 130 finds at least one video file that satisfies the search information from the storage unit 120, and controls the display unit 140 to display the video file list including the video files found from the storage unit 120.

Further, the control unit 130 may control the display unit 140 to display the found video files according to frequency of execution when displaying the video file list.

For example, in FIG. 8, the display unit 140 displays a video file list including at least one video file with a name including 'S', where 'S' was the search information input by the user (810). The display unit 140 may display a name and a number corresponding to each of the video files. In an alternate embodiment, the display unit 140 may display the video file list in a thumbnail form.

The user selects a number from the numbers assigned to found video files (S725). In making the selection, the user may select two or more video files by selecting two or more numbers from numbers assigned to the found video files.

The display unit 140 may highlight the name of a selected video file and the number assigned to the video file using a highlight (S730). For example, in FIG. 8, the display unit 140 may highlight the name of a video file assigned to the number '3', when the user presses or touches the '3' key (820). If the display unit 140 displays five (5) names to which numbers 1-5 are assigned, one number and name is highlighted according to the user's selection.

Thereafter, the mobile terminal 100 may play the video file to which the selected number is assigned (FIG. 7, S740 and FIG. 8, 830), when the user selects a specified key (S735).

Furthermore, the mobile terminal 100 may execute steps S730 and S735 if a key of the assigned number is pressed or touched for a shorter duration than a reference time, or execute step S740 directly after step S725 if the key of the assigned number is pressed or touched for an equal or a longer duration than the reference time.

As discussed above, in an alternate embodiment, it is possible to omit steps S730 and S735. In the alternate embodiment, the mobile terminal 100 may directly enter the mode for performing functions related to the video file.

Figure 9:
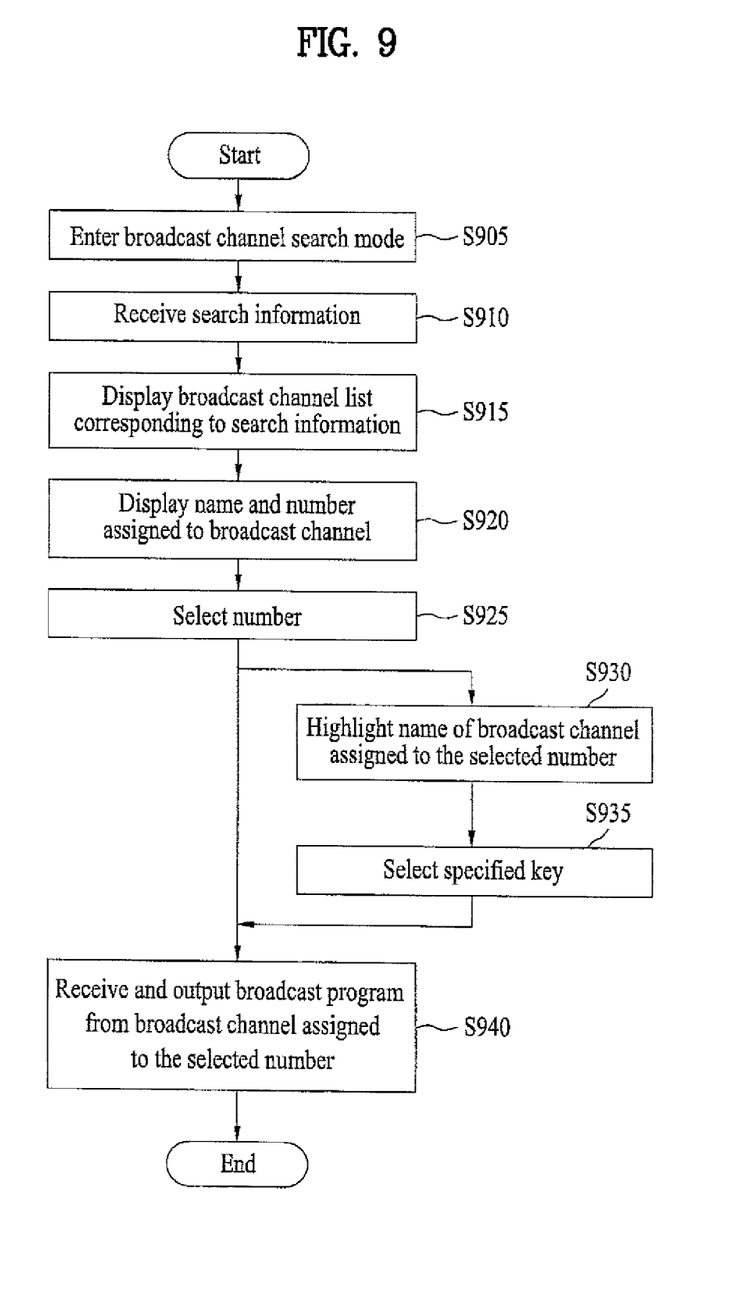
FIG. 9 is a flowchart illustrating a detailed process of performing a data procedure according to a fourth embodiment according to the present invention.

Referring to FIGS. 1 and 9, a data performing procedure according to the fourth embodiment is described. In FIG. 9, the data refers to a broadcast channel. The mobile terminal 100 enters a broadcast channel search mode for searching for a broadcast channel according to the user's selection (S905). The mobile terminal 100 receives search information from the user for searching at least one broadcast channel (S910). As discussed, the search information may be a letter or number including a name of a broadcast channel.

The display unit 140 displays a broadcast channel list including at least one broadcast channel corresponding to the search information (S915). The display unit 140 displays a name of the broadcast channel and a number assigned to the broadcast channel when displaying the broadcast channel list (S920).

Further, the control unit 130 may control the display unit 140 to display the found broadcast channels according to frequency of use when displaying the broadcast channel list.

Figure 10:
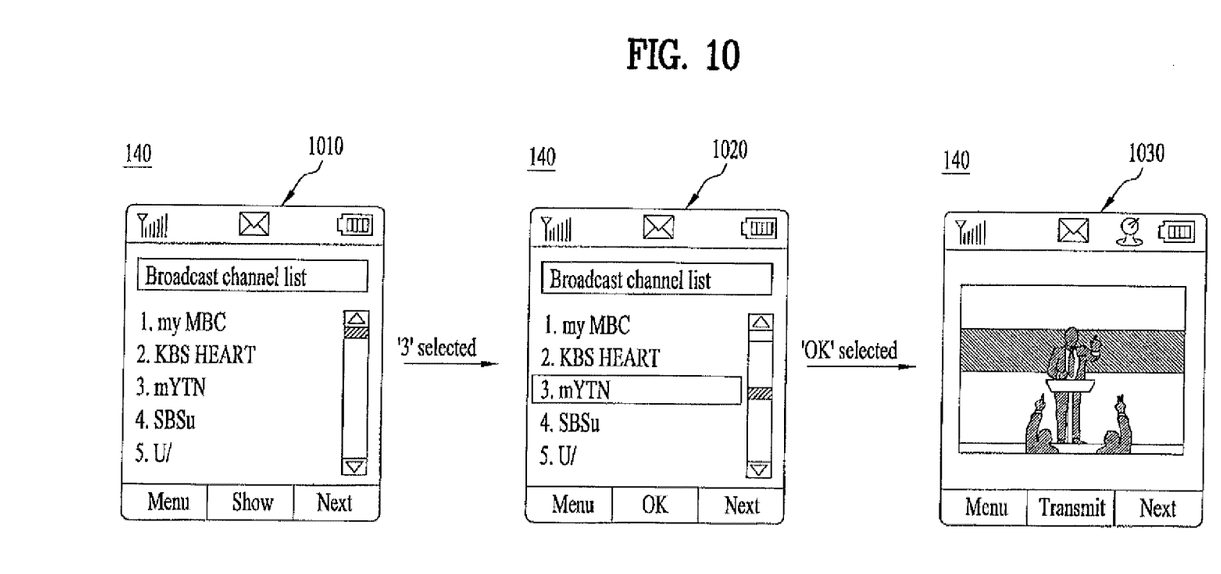
FIG. 10 illustrates various displays on a screen related to performing the data procedure shown in FIG. 9 according to the present invention.

For example, in FIG. 10, the display unit 140 displays a broadcast channel list including at least one broadcast channel corresponding to the search information input by the user through the input unit 110 (1010).

The user selects a number among the numbers assigned to the broadcast channels (S925). The display unit 140 highlights the name corresponding to a broadcast channel to which the selected number is assigned (S930).

For example, in FIG. 10, the display unit 140 may highlight the name of a broadcast channel assigned to the number '3', when the user presses or touches the '3' key (1020). The display unit 140 displays five names to which numbers 1-5 are assigned and one number and name are highlighted according to the selection of the user.

Thereafter, the mobile terminal 100 may receive a broadcast program from the broadcast channel to which the selected number is assigned through broadcast module 160 and outputs the received broadcast program (FIG. 9, S940 and FIG. 10, 1030) when the user selects a specified key (S935).

Furthermore, the mobile terminal 100 may execute steps S930 and S935 if a key of the assigned number is pressed or touched for a shorter duration than a reference time, or execute step S940 directly after step S925 if the key of the assigned number is pressed or touched for an equal or longer duration than the reference time.

As discussed above, in an alternate embodiment, it is possible to omit steps S930 and S935. In the alternate embodiment, the mobile terminal 100 may directly enter the mode for performing functions related to the broadcast channel.

Figure 11:
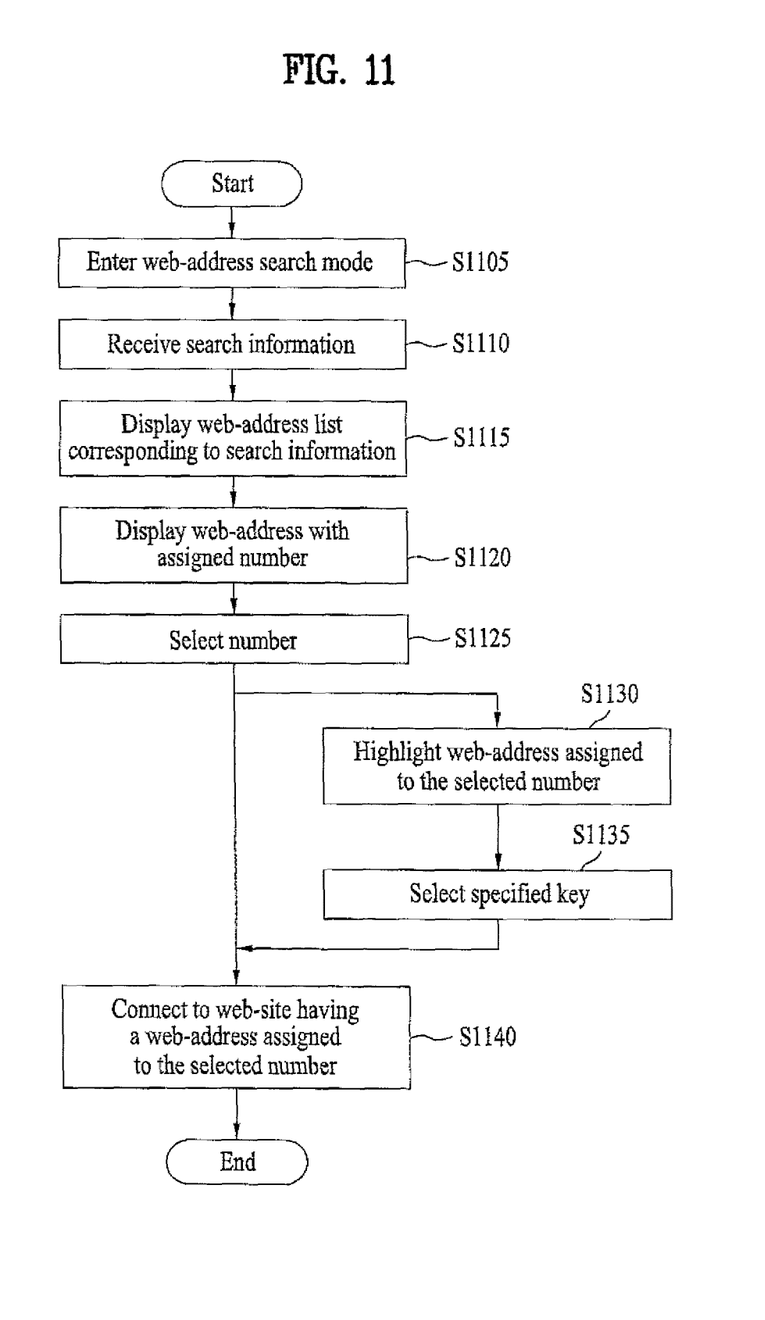
FIG. 11 is a flowchart illustrating a detailed process of performing a data procedure according to a fifth embodiment according to the present invention.

Referring to FIGS. 1 and 11, a data performing procedure according to the fifth embodiment is described. In FIG. 11, the data refers to an address of a web site, also referred to as a web-address. The mobile terminal 100 enters a web-address search mode for searching for a web-address according to the user's selection (S1105). The mobile terminal 100 receives the search information from the user for searching for at least one web-address (S1110).

The mobile terminal 100 displays an input window on a part of a screen and displays the received search information on the input window. As discussed, the search information may include a letter, a number, and a symbol. Specifically, the input window may indicate a web-address input window. For example, in FIG. 12, the display unit 140 displays 'http://www.da' which is search information input by the user on the web-address input window (1210).

The display unit 140 displays a web-address list including at least one web-address or at least one name assigned to the web-address corresponding to the search information (S1115). The display unit 140 displays each of the web-address with a number assigned to the web-address when displaying the web-address list (S1120).

Further, the control unit 130 finds the web-address, from the storage unit 120 and controls the display unit 140 to display the web-address list which includes the web-address found based on the search information.

The web-address stored in the storage unit 120 includes at least one of a web-address previously visited, a web-address selected by the user, and a web-address set as the mobile terminal's 100 default web-address.

Further, the control unit 130 may control the display unit 140 to display in order the searched or found web-addresses according to frequency of connection when displaying the web-address list. For example, in FIG. 12, the display unit 140 displays a web-address list including at least one web-address including 'http://www.da' (1210). The web-addresses are displayed with a number assigned to each of the web-addresses.

The user selects a number assigned to the web-address found from the storage unit 120 (S1125). The user may select a number using a number key of a key pad or a touch screen.

The display unit 140 highlights a web-address corresponding to the selected number (S1130). The display unit 140 may also distinguish the selected web-address and the assigned number using a specific color, or a specific pattern, in addition to a highlight. For example, in FIG. 12, the display unit 140 may highlight 'http://www.dada.net' a web-address assigned to the number '3', if the user presses or touches the '3' key on the input unit 110 (1220).

Thus, the mobile terminal 100 connects to the web-site having the web-address to which the selected number is assigned through the wireless communication module 150 (FIG. 11, S1140 and FIG. 12, 1230), when the user selects a specified key (S1135). As discussed, the specified key can be any key or a button on the device.

Furthermore, the mobile terminal 100 may execute steps S1130 and S1135 if a key of the assigned number is pressed or touched for a shorter duration than a reference time at S1125, or execute step S1140 directly after step 1125 if the key of the assigned number is pressed or touched for an equal or a longer duration than the reference time.

As discussed above, in an alternate embodiment, it is possible to omit steps S1130 and S1135. In the alternate embodiment, the mobile terminal 100 may directly enter the mode for performing functions related to the web-address.

Figure 12:
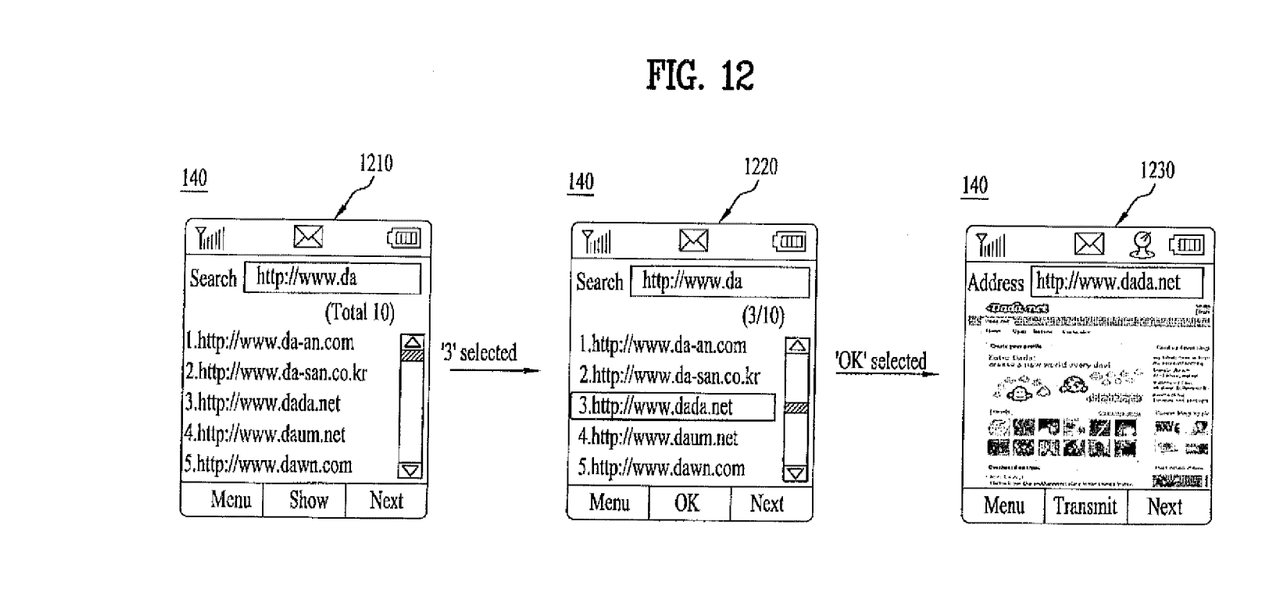
FIG. 12 illustrates various displays on a screen related to performing the data procedure shown in FIG. 11 according to the present invention.

As shown in FIG. 12, the display unit 140 may display a web-page of the connected 'http://www.dada.net' on a screen (1230).

Figure 13:
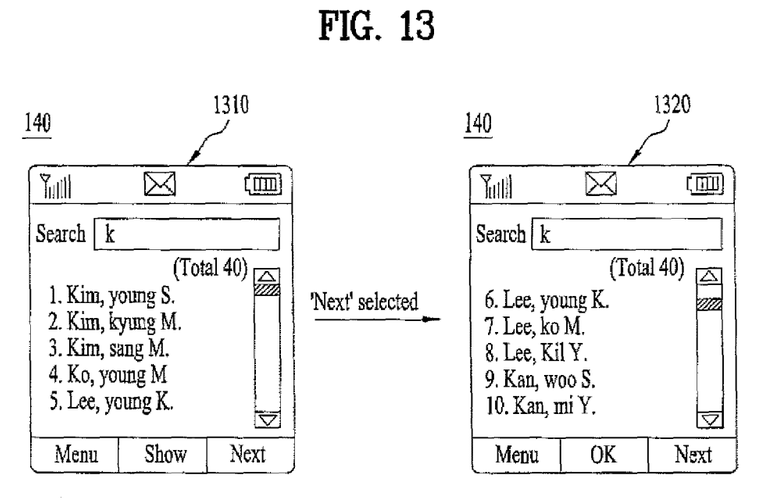
FIG. 13 illustrates exemplary diagrams of a procedure for displaying a data list according to the present invention.

In another feature of the present invention illustrated in FIG. 13, the display unit 140 may display another data list or an additional data list by transitioning from a displayed page to another page according to the user's selection (1310, 1320). That is, if the data list has more names and phone numbers than may be displayed on one page, the user may select to go to the next page which contains more names and phone numbers. For example, if a screen displays ten names and phone numbers at a time, the fourteenth name and phone number would be displayed by going to the next screen.

As described above, according to the present invention, a mobile terminal may perform functions related to specific data when a user selects an assigned number which corresponds to the specific data.

According to the present invention, the mobile terminal may transmit a call or a message to a phone number if the user selects an assigned number which corresponds to the phone number.

According to the present invention, the mobile terminal may play an audio file or a video file if the user selects an assigned number which corresponds to the audio file or the video file.

According to the present invention, the mobile terminal may output a broadcast program from a broadcast channel if the user selects an assigned number which corresponds to the broadcast channel.

According to the present invention, the mobile terminal may connect to a web-site if the user selects an assigned number which corresponds to an address of the web-site.

It will be apparent to those skilled in the art that various modifications and variations can be made in the present invention without departing from the spirit or scope of inventions. Thus, it is intended that the present invention covers the modifications and variations of this invention provided they come within the scope of the appended claims and their equivalents.

What is claimed is:

1. A method for displaying items on a mobile terminal, the method comprising:
   displaying an input window on a display of the mobile terminal;
   receiving a first user input in the input window to select search information;
   generating a web address list using data stored in memory coupled to the mobile terminal, based on the search information;
   displaying, on the display, the generated web address list comprising a plurality of web addresses and distinct numbers, each of the distinct numbers corresponding to a unique web address of the plurality of web addresses;
   receiving a second user input via a user's contact with an input key to select an assigned number among the distinct numbers on the web address list;
   making a connection to a web site having the unique web address corresponding to the selected assigned number,
   wherein the connection is made directly when a duration of the user's contact is equal to or longer than a reference time,
   wherein the unique web address corresponding to the selected assigned number is highlighted and the connection is made indirectly when the duration is less than the reference time, wherein displaying the generated web address list comprises displaying a total number of the plurality of web addresses in the web address list and displaying the plurality of web addresses of the generated web address list according to frequency of connection, and wherein highlighting the web address corresponding to the selected assigned number comprises distinguishing the web address using at least a specific color or a specific pattern.

2. The method according to claim 1, further comprising:
displaying the web site having the unique web address corresponding to the selected assigned number.

3. The method according to claim 1, wherein the first user input and the second user input are received via a number key of the mobile terminal.

4. The method according to claim 1, wherein the display comprises a touchscreen display and the first user input and the second user input are received via at least one touchscreen key on the touchscreen display.

5. The method according to claim 1, further comprising:
automatically displaying an option menu associated with the web address corresponding to the selected assigned number.

6. A mobile terminal, comprising:
a display unit configured to display an input window;
an input unit configured to receive a first user input in the input window to select search information;
a storage unit configured to store data; and
a control unit configured to:
generate a web address list using the data stored in the storage unit, based on the search information;
control the display unit to display the generated web address list comprising a plurality of web addresses and distinct numbers, each of the distinct numbers corresponding to a unique web address of the plurality of web addresses of the generated web address list;
control the input unit to receive a second user input via a user's contact with an input key that selects an assigned number among the distinct numbers on the web address list; and
make a connection to a web site having the unique web address corresponding to the selected assigned number, wherein the connection is made directly when a duration of the user's contact is equal to or longer than a reference time, wherein the unique web address corresponding to the selected assigned number is highlighted and the connection is made indirectly when the duration is less than the reference time, wherein displaying the generated web address list comprises displaying a total number of the plurality of web addresses in the web address list and displaying the plurality of web addresses of the generated web address list according to frequency of connection, and wherein highlighting the web address corresponding to the selected assigned number comprises distinguishing the web address using at least a specific color or a specific pattern.

7. The mobile terminal of claim 6, wherein the control unit is further configured to perform at least one function associated with the web address corresponding to the selected assigned number.

8. The mobile terminal of claim 7, wherein the input unit comprises a number key or a touch screen that is coupled to the display unit, and the first user input and the second user input are received via the number key or via the touch screen.

9. The mobile terminal of claim 7, wherein the control unit is further configured to perform the at least one function when a further user input is received via the input unit.

10. The mobile terminal of claim 7, wherein the control unit is further configured to control the display unit to display a menu associated with the web address corresponding to the selected assigned number.

\* \* \* \* \*